United States Patent
Pang et al.

(10) Patent No.: US 11,489,710 B2
(45) Date of Patent: Nov. 1, 2022

(54) FREQUENCY OFFSET ESTIMATION AND COMPENSATION FOR HIGH PERFORMANCE WIRELESS COMMUNICATIONS IN SUBSTATION AUTOMATION

(71) Applicant: Hitachi Energy Switzerland AG, Baden (CH)

(72) Inventors: Zhibo Pang, Västerås (SE); Michele Luvisotto, Västerås (SE); Dacfey Dzung, Wettingen (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/969,715

(22) PCT Filed: Feb. 13, 2018

(86) PCT No.: PCT/EP2018/053526
§ 371 (c)(1),
(2) Date: Aug. 13, 2020

(87) PCT Pub. No.: WO2019/158182
PCT Pub. Date: Aug. 22, 2019

(65) Prior Publication Data
US 2021/0006449 A1    Jan. 7, 2021

(51) Int. Cl.
*H04L 27/26*    (2006.01)
*H04L 27/00*    (2006.01)

(52) U.S. Cl.
CPC ...... *H04L 27/2657* (2013.01); *H04L 27/2613* (2013.01); *H04L 27/2662* (2013.01);
(Continued)

(58) Field of Classification Search
CPC ............ H04L 27/2613; H04L 27/2657; H04L 27/2662; H04L 27/2675; H04L 27/2678; H04L 27/2679; H04L 2027/0028
See application file for complete search history.

(56) References Cited

U.S. PATENT DOCUMENTS 7,940,849 B1    5/2011  Fang et al.
8,184,727 B2    5/2012  Li et al.
(Continued)

FOREIGN PATENT DOCUMENTS

CN    101346956 A    1/2009
CN    107409028 A    11/2014
(Continued)

OTHER PUBLICATIONS

Athaudage, Chandranath R. N., et al., "A Low Complexity Timing and Frequency Synchronization Algorithm for OFDM Systems", IEEE Global Telecommunications Conference, Taipei, Taiwan, Nov. 17-21, 2002, pp. 244-248.
(Continued)

*Primary Examiner* — David B Lugo
(74) *Attorney, Agent, or Firm* — Slater Matsil, LLP (57) ABSTRACT

A method is used for frequency offset estimation in a wireless communication network that employs time based scheduling of packets. The method is performed by a packet receiver in the wireless communication network. The method includes receiving a packet from a packet transmitter. The packet includes a preamble that is composed of samples of a single orthogonal frequency-division multiplexing symbol. The preamble has a cyclic prefix (CP) defined by a repetition of samples from an end-portion of the preamble and the preamble, except for the CP, is free from any repeated sequence of samples. The method also includes determining a sequence of similarity measure values between the CP of the preamble and the end-portion of the
(Continued)

preamble, applying a low-pass filter to the sequence of similarity measure values, resulting in a filtered sequence of similarity measure values, and performing frequency offset estimation on the filtered sequence of similarity measure values.

19 Claims, 4 Drawing Sheets

(52) U.S. Cl.
CPC ...... *H04L 27/2675* (2013.01); *H04L 27/2678* (2013.01); *H04L 2027/0028* (2013.01)

(56) References Cited

U.S. PATENT DOCUMENTS

| | | | |
|---|---|---|---|
| 9,413,840 B2 | 8/2016 | Taylor et al. | |
| 10,218,602 B2* | 2/2019 | Levy-Abegnoli | H04L 45/16 |
| 2002/0154688 A1* | 10/2002 | Pollmann | H04L 27/0012 |
| | | | 375/229 |
| 2006/0114812 A1* | 6/2006 | Kim | H04L 5/0048 |
| | | | 370/206 |
| 2006/0222095 A1 | 10/2006 | Niu et al. | |
| 2008/0013650 A1* | 1/2008 | Engdahl | H04B 1/7117 |
| | | | 375/344 |
| 2009/0003423 A1* | 1/2009 | Oh | H04L 27/2678 |
| | | | 375/226 |
| 2009/0067517 A1* | 3/2009 | Hung | H04L 27/2672 |
| | | | 375/260 |
| 2011/0149724 A1* | 6/2011 | Lee | H04L 27/2688 |
| | | | 370/216 |
| 2016/0211953 A1* | 7/2016 | Ezaki | H04L 27/0014 |
| 2017/0257243 A1 | 9/2017 | Sahlin et al. | |
| 2017/0279531 A1* | 9/2017 | Drummond | H04B 10/6971 |
| 2017/0373812 A1 | 12/2017 | Berggren et al. | |
| 2018/0083747 A1* | 3/2018 | Doan | H04B 7/0452 |

FOREIGN PATENT DOCUMENTS

| | | |
|---|---|---|
| CN | 104506475 A | 4/2015 |
| CN | 106688199 A | 5/2017 |
| KR | 101145002 B1 | 5/2012 |

OTHER PUBLICATIONS

El Hajj Shehadeh, Youssef, et al., "A Blind Timing and Frequency Synchronization Method Based on the Correlation Characteristics of an OFDM Signal", 2015 IEEE 16th International Workshop on Signal Processing Advances in Wireless Communications (SPAWC), Jun. 28, 2015, pp. 480-484.
Van De Beek, Jan-Jaap, et al., "ML Estimation of Time and Frequency Offset in OFDM Systems", IEEE Transactions on Signal Processing, vol. 45, No. 7, Jul. 1997, pp. 1800-1805.
Van De Beek, Jan-Jaap, et al., "ML Estimation of Timing and Frequency Offset in Multicarrier Systems", Apr. 1996, 25 pages, retrieved from http://www.sm.luth.Se/csee/sp/research/report//bsb96r.pdf.
Athaudage, Chandranath R. N., et al., "A Low Complexity Timing and Frequency Synchronization Algorithm for OFDM Systems", Global Telecommunications Conference, Taipei, Taiwan, Nov. 17-21, 2002, 5 pages.

* cited by examiner

FREQUENCY OFFSET ESTIMATION AND COMPENSATION FOR HIGH PERFORMANCE WIRELESS COMMUNICATIONS IN SUBSTATION AUTOMATION

CROSS-REFERENCE TO RELATED APPLICATIONS

This application is a national phase application of International Application No. PCT/EP2018/053526, filed on Feb. 13, 2018, which application is incorporated herein by reference.

TECHNICAL FIELD

Embodiments presented herein relate to a method, a packet receiver, a computer program, and a computer program product for frequency offset estimation in a wireless communication network for power grid control.

BACKGROUND

Wireless networks to be used in the control of power grids, for example in substation automation, require low latency and high reliability. Currently available industrial wireless standards, such as WirelessHART (where HART is short for Highway Addressable Remote Transducer) or Wireless Network for Industrial Automation-Factory Automation (WIA-FA), are not able to provide very high performance in these regards, because they rely on non-optimized physical (PHY) communications layers. For example, WIA-FA is based on the IEEE 802.11g/n PHY layer, whose minimum transmission time for a packet of 100 bits is around 30 µs, while many power grid applications, currently based on wired local area networks (LANs) compliant with IEC 61850, require a slot time of a few µs or even lower.

One cause of the long transmission time in IEEE 802.11 is the use of long preamble sequences at the PHY layer. However, the long preamble in IEEE 802.11 is used for many purposes, including frequency offset (FO) estimation and correction, which are crucial to ensure reliable message delivery.

Frequency offset is a common source of non-ideality in wireless communications, due to a mismatch between the carrier frequency of a received signal and the frequency used for down-conversion at the local oscillator in the packet receiver. This mismatch can be ascribed to many factors, two of which are an offset between oscillators in the packet transmitter and packet receiver and Doppler effect. OFDM is more sensitive to frequency offset with than single-carrier modulation, since OFDM relies on subcarriers orthogonality. Frequency offset has hence to be estimated and then compensated for in baseband processing at the packet receiver before decoding the packet.

Existing schemes for frequency offset estimation (e.g. as disclosed in US 20060222095 A1 and CN 104506475 A) are based on correlating received sequences with known transmitter sequences. In absence of frequency offset, the correlation should have a zero phase, and therefore it is possible to estimate the frequency offset by observing the correlation phase. However, sending two identical OFDM symbols would double the transmission latency. On the other hand, building a symbol with two (or more) identical time sequences would result in zeros in the frequency domain, thus not allowing accurate channel estimation to be performed with the same symbol.

Hence, there is still a need for improved frequency offset estimation in wireless communication networks suitable for in the control of power grids.

SUMMARY

An object of embodiments herein is to provide efficient frequency offset estimation that does not suffer from the issues identified above, or at least where the issues noted above are reduced or mitigated.

According to a first aspect there is presented a method for frequency offset estimation in a wireless communication network for power grid control. The wireless communication network employs time based scheduling of packets. The method is performed by a packet receiver in the wireless communication network. The method comprises receiving a packet from a packet transmitter. The packet comprises a preamble. The preamble is composed of samples of a single OFDM symbol. The preamble has a CP defined by a repetition of samples from an end-portion of the preamble. The preamble, except for the CP, is free from any repeated sequence of samples. The method comprises determining a sequence of similarity measure values between the CP of the preamble and the end-portion of the preamble. The method comprises applying a low-pass filter to the sequence of similarity measure values, resulting in a filtered sequence of similarity measure values. The method comprises performing frequency offset estimation on the filtered sequence of similarity measure values.

According to a second aspect there is presented a packet receiver for frequency offset estimation in a wireless communication network for power grid control. The wireless communication network employs time based scheduling of packets. The packet receiver comprises processing circuitry. The processing circuitry is configured to cause the packet receiver to receive a packet from a packet transmitter. The preamble is composed of samples of a single OFDM symbol. The preamble has a CP defined by a repetition of samples from an end-portion of the preamble. The preamble, except for the CP, is free from any repeated sequence of samples. The processing circuitry is configured to cause the packet receiver to determine a sequence of similarity measure values between the CP of the preamble and the end-portion of the preamble. The processing circuitry is configured to cause the packet receiver to apply a low-pass filter to the sequence of similarity measure values, resulting in a filtered sequence of similarity measure values. The processing circuitry is configured to cause the packet receiver to perform frequency offset estimation on the filtered sequence of similarity measure values.

According to a third aspect there is presented a computer program for frequency offset estimation in a wireless communication network for power grid control, the computer program comprising computer program code which, when run on a packet receiver, causes the packet receiver to perform a method according to the first aspect.

According to a fourth aspect there is presented a computer program product comprising a computer program according to the third aspect and a computer readable storage medium on which the computer program is stored. The computer readable storage medium could be a non-transitory computer readable storage medium.

Advantageously this provides efficient frequency offset estimation.

Advantageously this frequency offset estimation does not suffer from the issues noted above.

Advantageously, the proposed method allows an efficient packet structure, enabling low latency wireless communications.

Advantageously, the combined use of CP-based similarity measure determination and schedule-aware low-pass filter enables accurate frequency offset estimation, even if the preamble is short.

It is to be noted that any feature of the first, second, third, and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
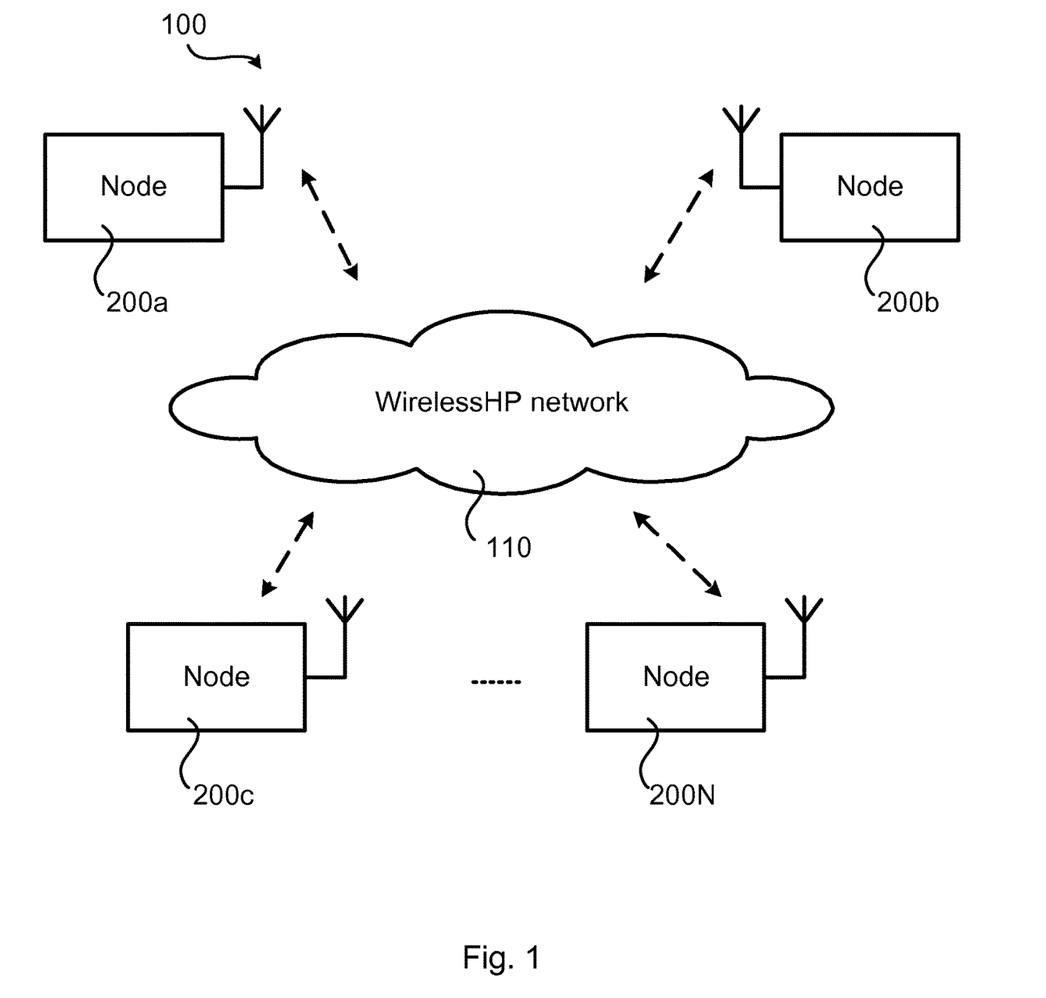
FIG. 1 is a schematic diagram illustrating a wireless communication network according to embodiments.

FIG. 1 schematically illustrates a wireless communication network 100 wherein the herein disclosed embodiments apply. Network entities denoted nodes 200a, 200b, ..., 200N are equipped with a radio frequency (RF) front-end that allows them to communicate over a wireless network 110. Each node may represent a component of a substation automation system, such as a gateway, circuit breaker, circuit protector, transformer, switchgear, etc., that is configured for exchanging control messages.

Each node 200a-200N may selectively act as a packet transmitter or a packet receiver. Without loss of generality it will hereinafter be assumed that node 200a will act as a packet receiver and that any of nodes 200b-200N will act as a packet transmitter.

Figure 2:
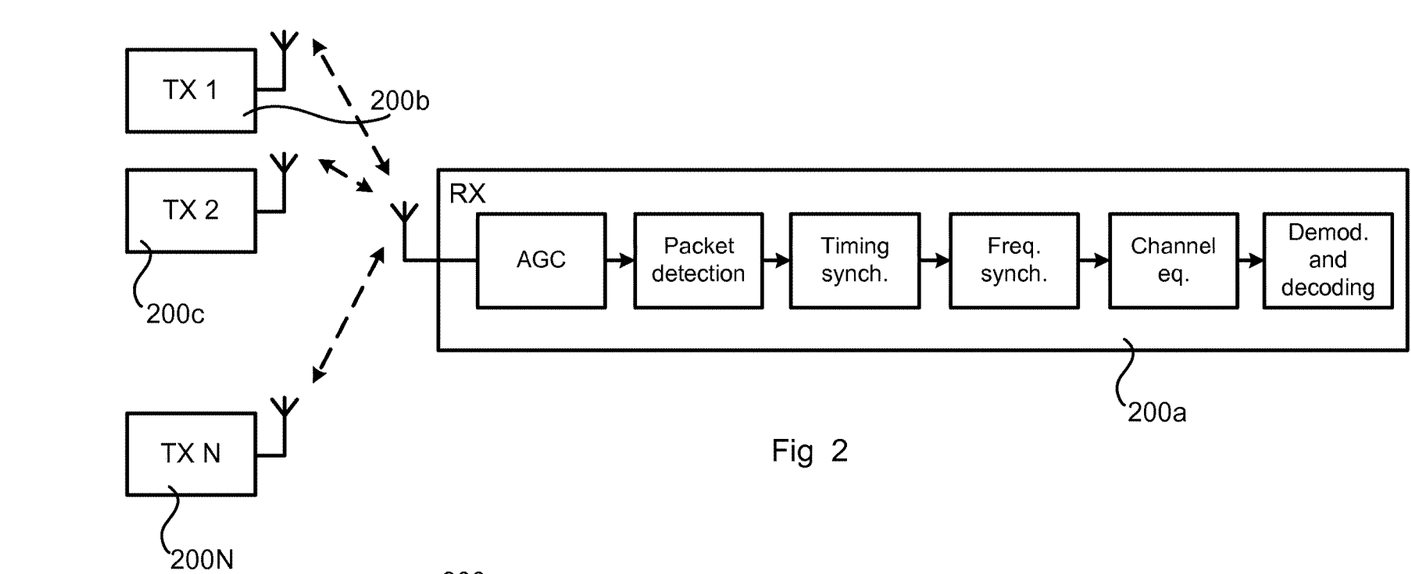
FIG. 2 schematically illustrates a packet receiver according to state of the art.

FIG. 2 schematically illustrates typical modules of a packet receiver 200a. The packet receiver 200a of FIG. 2 comprises an automatic gain control module, a packet detection module, a timing synchronization module, a frequency synchronization module, a channel equalization module, and a demodulation and decoding module. The frequency synchronization module might be configured to frequency offset estimation and frequency offset compensation. The functionality of these modules is as such known in the art and a description thereof is therefore omitted for brevity. In currently existing packet receivers 200a, these modules are implemented based on exploiting long repeated sequences in the preamble of the received packets and one way to estimate frequency offset is to exploit the correlation between identical sequences of samples.

Figure 3:
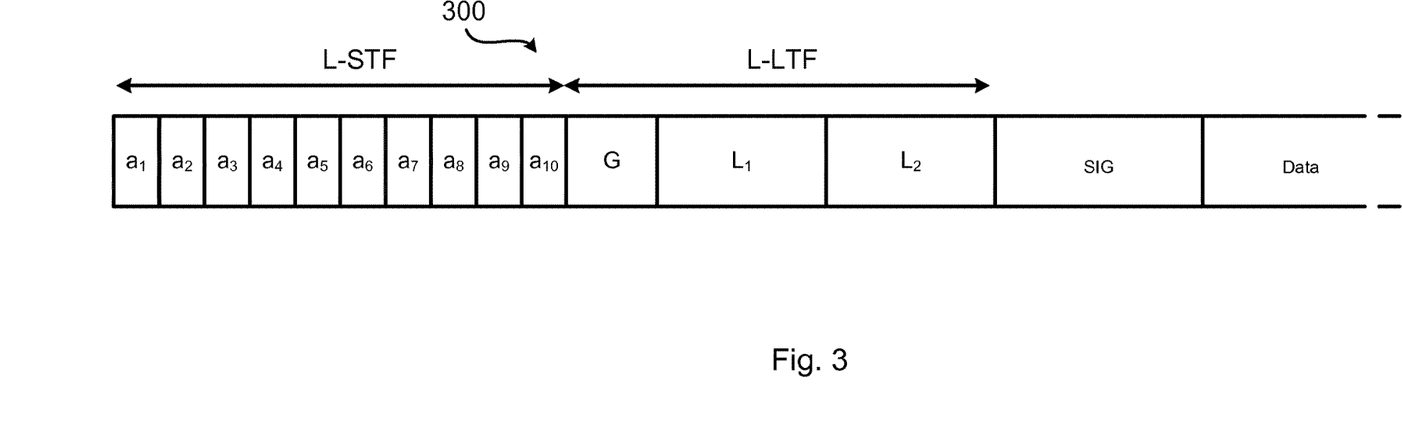
FIG. 3 schematically illustrates a packet structure according to state of the art.

As an illustrative example, FIG. 3 schematically illustrates the packet structure of a packet 300 used in IEEE 802.11a/g. For example, in the IEEE 802.11a/g standard, the legacy short training field (L-STF) part of the preamble contains ten repeated sequence, $a_1, a_2, \ldots, a_{10}$, of 16 samples each, the last three of which are used for coarse frequency offset estimation. The legacy long training field (L-LTF) part contains two repeated sequences, $l_1, l_2$, of 64 samples each, which are used for fine frequency offset estimation. Once the frequency offset has been estimated, it is compensated by applying a corresponding phase rotation to all the data samples.

In order to achieve low latency for short-size packets exchanged in wireless networks for power grid control applications, the size of the PHY layer preamble should be kept small, possibly limited to just one single OFDM symbol. In order to still ensure reliable communications, the herein disclosed packet receiver 200a exploits the cyclic prefix (CP) of orthogonal frequency-division multiplexing (OFDM) symbols to achieve accurate frequency offset estimation (as well as compensation), avoiding the use of repeated sequences in the preamble.

The embodiments disclosed herein thus relate to mechanisms for frequency offset estimation in a wireless communication network 100 for power grid control. In order to obtain such mechanisms there is provided a packet receiver 200a, a method performed by the packet receiver 200a, a computer program product comprising code, for example in the form of a computer program, that when run on a packet receiver 200a, causes the packet receiver 200a to perform the method.

Figure 4:
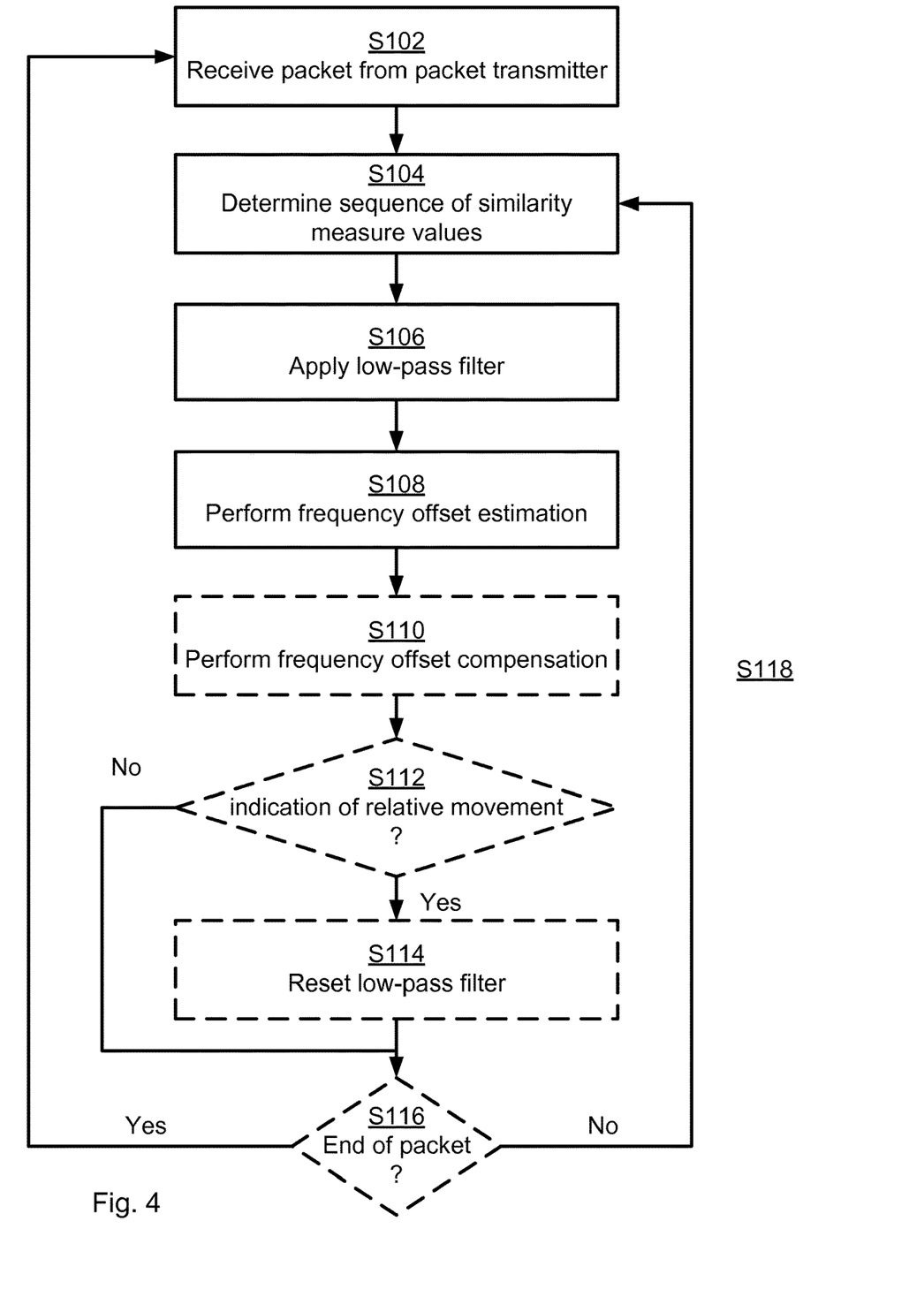
FIG. 4 is a flowchart of methods according to embodiments.

FIG. 4 is a flowchart illustrating embodiments of methods for frequency offset estimation in a wireless communication network 100 for power grid control. The wireless communication network 100 employs time based scheduling of packets. The methods are performed by the packet receiver 200a. The methods are advantageously provided as a computer program 720.

It is assumed that the node acting as packet receiver 200a receives a packet 500 from one of the other nodes acting as packet transmitter 200b-200N. The packet receiver 200a is thus configured to perform step S102:

S102: The packet receiver 200a is configured to receive a packet 500 from a packet transmitter 200b, 200c, ..., 200N.

Figure 5:
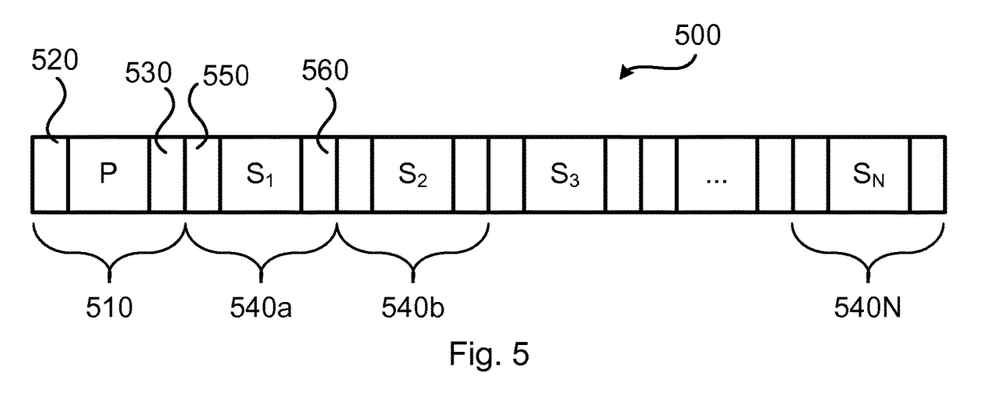
FIG. 5 schematically illustrates a packet structure according to an embodiment.

In order to estimate the frequency offset, the inherent correlation brought by the use of CP in OFDM symbols is exploited. Parallel reference is here made to FIG. 5. FIG. 5 schematically illustrates the structure of a packet 500 according to an embodiment. The packet 500 comprises a preamble 510. The preamble 510 is composed of samples of a single OFDM symbol. Further, the preamble 510 has a CP 520 defined by a repetition of samples from an end-portion 530 of the preamble 510. In general terms, the CP might be inserted at the beginning of each OFDM symbol by copying the last samples of the symbol itself to, for example, mitigate inter-symbol interference between consecutive OFDM symbols. The preamble P, except for the CP 520, is free from any repeated sequence of samples. As will be further disclosed the packet 500 may further comprise one or more data symbols 540a, 540b, . . . , 540N, with respective data content denoted $S_1$, $S_2$, . . . , $S_N$. Each data symbol 540a, 540b, . . . , 540N has its own CP 550 and end-portion 560 (in FIG. 5 identified only for data symbol 540a). Each data symbol 540a, 540b, . . . , 540N might be composed of samples of a single OFDM symbol.

A short preamble 510 composed of just one OFDM symbol (whose duration corresponds to the first five L-STF short sequences in FIG. 3) is thus adopted. This preamble 510 cannot contain any repeated sequence, since a repetition in time will cause the presence of zeros in the frequency domain. In that case, after Fast Fourier Transform (FFT) is performed, it would not be possible to perform frequency-domain channel estimation on the zero-valued subcarriers.

S104: The packet receiver 200a is configured to determine a sequence of similarity measure values between the CP 520 of the preamble 510 and the end-portion 530 of the preamble 510.

S106: The packet receiver 200a is configured to apply a low-pass filter to the sequence of similarity measure values, resulting in a filtered sequence of similarity measure values.

The packet receiver 200a then performs frequency offset estimation. Particularly, the packet receiver 200a is configured to perform step S108:

S108: The packet receiver 200a is configured to perform frequency offset estimation on the filtered sequence of similarity measure values.

Embodiments relating to further details of frequency offset estimation in a wireless communication network 100 for power grid control as performed by the packet receiver 200a will now be disclosed.

Assume that the i:th OFDM symbol is represented by the following sequence of samples:

$$r_i(0), \ldots, r_i(N_{FFT}+L),$$

where $N_{FFT}$ is the FFT size and L is the length of the cyclic prefix.

Assuming that the frequency offset is $f_\Delta$ and in absence of noise, the k:th received sample in the sequence can be expressed as:

$$r_i(k)=s_i(k)\cdot e^{j2\pi f_\Delta T_s k},$$

where $s_i(k)$ is the k:th transmitted sample in the i:th OFDM symbol and $T_s$ is the sampling time.

There could be different ways for the packet receiver 200a to obtain the similarity measure values. In some aspects the similarity measure values are obtained through correlation. Thus, according to an embodiment the sequence of similarity measure values is determined by correlating the CP 520 of the preamble 510 with the end-portion 530 of the preamble 510.

In other aspects the similarity measure values are obtained through mechanisms such as mean similarity, root mean square similarity or peak similarity. These mechanisms are as such known to the person skilled in the art as disclosed in Section 3 of Cassisi, Carmelo, et al. "Similarity measures and dimensionality reduction techniques for time series data mining" in Advances in data mining knowledge discovery and applications, InTech, 2012, DOI: 10.5772/49941.

The cyclic prefix-based similarity measure value for the i:th OFDM symbol can thus be determined by multiplying the first L samples of the OFDM symbol (corresponding to the cyclic prefix) with the complex conjugate of the last L samples. In absence of noise, the result is:

$$\Lambda_i = e^{-j2\pi f_\Delta N_{FFT}T_s} \cdot \sum_{k=0}^{L-1} |s_i(k)|^2,$$

How to estimate the frequency offset from this quantity will be disclosed below.

To improve the estimation accuracy, a low-pass filter can be used to process the correlation value. Denote by $\Lambda_i$ the similarity measure value before low-pass filtering and $\tilde{\Lambda}_i$ the similarity measure value after low-pass filtering.

According to a generic low-pass filtering implementation, the output value of the low-pass filtering for the i:th OFDM symbol can be expressed as:

$$\tilde{\Lambda}_i = \alpha_1\Lambda_i + \alpha_2\Lambda_{i-1} + \ldots + \alpha_{n+1}\Lambda_{i-n} - \beta_2\widetilde{\Lambda_{i-1}} - \ldots - \beta_{m+1}\widetilde{\Lambda_{i-m}}.$$

This yields a transfer function H(z) for the low-pass filter according to:

$$H(z) = \frac{\alpha_1 + \alpha_2 z^{-1} + \ldots + \alpha_{n+1}z^{-n}}{1 + \beta_2 z^{-1} + \ldots + \beta_{m+1}z^{-m}}.$$

As an illustrative and non-limiting example, a moving average filter can be obtained from H(z) by setting n=0, m=1, $\alpha_1=\alpha$, and $\beta_2=\alpha-1$. Thus, $\tilde{\Lambda}_i$ can be expressed as:

$$\tilde{\Lambda}_i = \alpha\Lambda_i + (1-\alpha)\widetilde{\Lambda_{i-1}}.$$

In this way, the similarity measure values determined for the previous OFDM symbols play a role in the low-pass filtering operations for the i:th OFDM symbol. Hence, according to an embodiment the sequence of similarity measure values depends on a previously determined sequence of similarity measure values.

Advantageously, the accuracy of the frequency offset estimation increases with the number of previously determined sequence of similarity measure values. Therefore, the use of the low-pass filter ensures that the estimation converges to the true frequency offset value (i.e. the frequency offset due to synchronization mismatches between transmitter and receiver oscillators). In this respect, the previous OFDM symbols can also belong to previous packets, i.e., where the state of the low-pass filter is not reset after reception of each packet 500. In this respect, the state of the filter is defined by the K latest-most similarity measures.

Since the frequency offset might depend on the transmitter-receiver pair and the packet receiver 200a might receive respective packets 500 from multiple packet transmitters 200b, 200c, . . . , 200N, a separate low-pass filter might be maintained at the packet receiver 200a for each possible packet transmitter 200b, 200c, . . . , 200N. Particularly, according to an embodiment the packet receiver 200a has access to a set of low-pass filters. Which low-pass filter to use then depends on from which packet transmitter 200b, 200c, . . . , 200N the packet 500 is received.

In the assumed wireless communication network 100, the access to the to channel is strictly scheduled in time (e.g. time-division multiple access (TDMA)), so that each node acting as a packet receiver 200a is aware of when it will receive a packet 500 and from which packet transmitter 200b, 200c, . . . , 200N. This knowledge will allow the packet receiver 200a to select the appropriate low-pass filter to update with the just determined sequence of similarity measure values.

In some aspects, the frequency offset is estimated for each OFDM symbol based on the updated sequence of similarity measure values returned by the low-pass filter. In more detail, the frequency offset can be derived by determining the complex phase of the sequence of similarity measure values (e.g. by using the CORDIC algorithm (where CORDIC is short for COordinate Rotation DIgital Computer), also known as Volder's algorithm)) and scaling it appropriately, taking into account sample time and FFT size. Particularly, according to an embodiment the frequency offset estimation yields a frequency offset estimate value. This frequency offset estimate value corresponds to a phase rotation value. According to an embodiment the packet receiver 200b is then configured to perform (optional) step S110:

S110: The packet receiver 200a frequency compensates the OFDM symbol by applying the opposite phase rotation value to the OFDM symbol.

At each OFDM symbol, the estimated frequency offset might thus be compensated for by applying an opposite phase rotation to the OFDM symbol.

In general terms, if the packet transmitter 200b, 200c, . . . , 200N and/or packet receiver 200a move, Doppler effects might arise, thus changing the frequency offset value. In some aspects the low-pass filter is therefore reset upon detection of relative movement between the packet transmitter 200b, 200c, . . . , 200N and the packet receiver 200a. Hence, according to an embodiment the packet receiver 200b is configured to perform (optional) step S112:

S112: The packet receiver 200a receives an indication of relative movement between the packet receiver 200a and the packet transmitter 200b, 200c, . . . , 200N.

There could be different ways for the packet receiver 200a to receive the indication of relative movement. In some aspects the indication is received from protocol layers higher than the PHY layer. For example, the indication might be provided as localization information on the application layer.

The packet receiver 200a is then configured to, in and in response thereto (i.e., in response to having received the indication in step S112) perform step S114:

S114: The packet receiver 200a resets the low-pass filter to a default state, wherein in the default state the sequence of similarity measure value does not depend on any previously determined sequence of similarity measure values.

As noted above, the state of the filter is defined by the K latest-most similarity measures. Resetting the filter might thus comprise setting all the K latest-most similarity measures as used in the filter to default values. That is, with reference to the above expression for $\tilde{\lambda}_i$, instead of using $\overline{\tilde{\lambda}_{i-1}}$ as a value in the low-pass filter, a default value can be used. Hence, the corresponding low-pass filter might be reset, not taking into account older similarity measure values anymore.

As noted above, the packet 500 may further comprise one or more data symbols 540a, 540b, . . . , 540N, each having its own CP 550 and end-portion 560. Particularly, the packet 500 comprises at least one data symbol 540a, 540b, . . . , 540N. Each data symbol 540a, 540b, . . . , 540N then has its own CP 550. Each CP 550 is defined by a repetition of samples from an end-portion 560 of its data symbol 540a, 540b, . . . , 540N.

In some aspects the frequency offset estimation is also performed on at least one of the its data symbols 540a, 540b, . . . , 540N. It is thus checked (step S116) if there are more OFDM symbols in the packet 500. If there are no more OFDM symbols in the packet 500, step S102 can be entered again for a new packet. Else, if there are more OFDM symbols, according to an embodiment the determining in step S104, the applying in step S106, and the performing of frequency offset estimation in step S108 is performed (step S118) also for at least one of the at least one data symbol 540a, 540b, . . . , 540N.

In this respect, the same low-pass filter as used for the preamble 510 is used for the data symbol 540a, 540b, . . . , 540N.

Further aspects of frequency offset compensation will now be disclosed.

The frequency offset can from $\Lambda_i$ be estimated as:

$$\hat{f}_{\Delta,i} = -\frac{\text{phase}(\Lambda_i)}{2\pi N_{FFT} T_s}.$$

Once the frequency offset has been estimated, the frequency offset can be compensated by applying a phase rotation to the received samples of the OFDM symbol:

$$\hat{r}_i(k) = r_i(k) \cdot e^{-j2\pi \hat{f}_{\Delta,i} T_s k}.$$

If the frequency offset estimation is accurate (i.e., the estimated frequency offset is equal to the true frequency offset; $\hat{f}_\Delta = f_\Delta$), the received samples are equal to the transmitted samples, and hence the effect of the true frequency offset is compensated.

Figure 6:
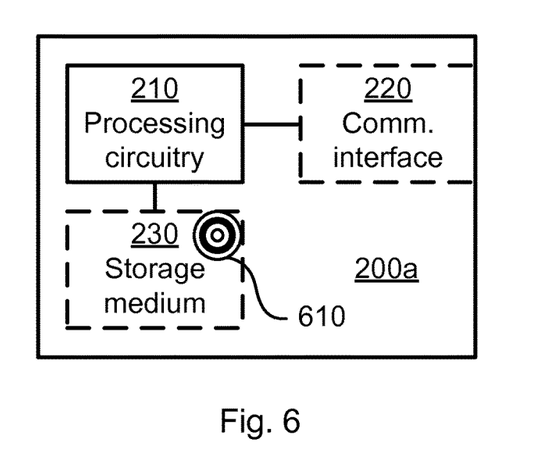
FIG. 6 is a schematic diagram showing functional units of a packet receiver according to an embodiment.

FIG. 6 schematically illustrates, in terms of a number of functional units, the components of a packet receiver 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the packet receiver 200a to perform a set of operations, or steps, S102-S104e, as disclosed above. For example, the storage medium 230 may store the set of operations, and the processing circuitry 210 may be configured to retrieve the set of operations from the storage medium 230 to cause the packet receiver 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The packet receiver 200a may further comprise a communications interface 220 at least configured for communications with at least one packet transmitter 200a-200N. As such the communications interface 220 may comprise one or more transmitters and receivers, comprising analogue and digital components. The processing circuitry 210 controls the general operation of the packet receiver 200a e.g. by sending data and control signals to the communications interface 220 and the storage medium 230, by receiving data and reports from the communications interface 220, and by retrieving data and instructions from the storage medium 230. Other components, as well as the related functionality, of the packet receiver 200a are omitted in order not to obscure the concepts presented herein.

Figure 7:
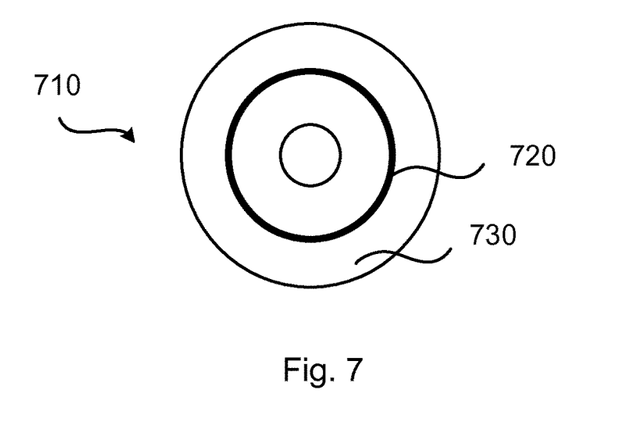
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed. In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for frequency offset estimation in a wireless communication network that employs time based scheduling of packets, the method being performed by a packet receiver in the wireless communication network, the method comprising:
receiving a packet from a packet transmitter, wherein the packet comprises a preamble that is composed of samples of a single orthogonal frequency-division multiplexing (OFDM) symbol, wherein the preamble has a cyclic prefix (CP) defined by a repetition of samples from an end-portion of the preamble and wherein the preamble, except for the CP, is free from any repeated sequence of samples;
determining a sequence of similarity measure values between the CP of the preamble and the end-portion of the preamble;
applying a low-pass filter to the sequence of similarity measure values, resulting in a filtered sequence of similarity measure values, the filtered sequence of similarity measure values depending on a previously determined sequence of similarity measure values;
performing frequency offset estimation on the filtered sequence of similarity measure values; and
resetting the low-pass filter to a default state in response to receiving an indication of relative movement between the packet receiver and the packet transmitter, wherein in the default state the sequence of similarity measure value does not depend on any previously determined sequence of similarity measure values.

2. The method according to claim 1, wherein the packet receiver has access to a set of low-pass filters and wherein which low-pass filter to use depends on from which packet transmitter the packet is received.

3. The method according to claim 1, wherein the frequency offset estimation yields a frequency offset estimate value and wherein the frequency offset estimate value corresponds to a phase rotation value, the method further comprising frequency compensating the OFDM symbol by applying the opposite phase rotation value to the OFDM symbol.

4. The method according to claim 1, wherein the sequence of similarity measure values is determined by correlating the CP of the preamble with the end-portion of the preamble.

5. The method according to claim 1, wherein the packet comprises a plurality of data symbols, each data symbol having its own CP defined by a repetition of samples from an end-portion of the data symbol, wherein the steps of determining, applying, and performing frequency offset estimation is also performed for at least one of the data symbols.

6. The method according to claim 5, wherein the steps of determining, applying, and performing frequency offset estimation is also performed for all of the data symbols.

7. The method according to claim 1, wherein the packet receiver is part of a gateway, circuit breaker, circuit protector, transformer, or switchgear.

8. The method according to claim 1, wherein the packet transmitter is part of a gateway, circuit breaker, circuit protector, transformer, or switchgear.

9. The method according to claim 1, wherein the wireless communication network is associated with a power grid system and wherein the packet carries information related to the power grid system.

10. A packet receiver for frequency offset estimation in a wireless communication network that employs time based scheduling of packets, the packet receiver comprising processing circuitry that is configured to cause the packet receiver to:
receive a packet from a packet transmitter, wherein the packet comprises a preamble that is composed of samples of a single orthogonal frequency-division multiplexing (OFDM) symbol, the preamble having a cyclic prefix (CP) defined by a repetition of samples from an end-portion of the preamble, wherein the preamble, except for the CP, is free from any repeated sequence of samples;
determine a sequence of similarity measure values between the CP of the preamble and the end-portion of the preamble;
apply a low-pass filter to the sequence of similarity measure values, resulting in a filtered sequence of similarity measure values, the filtered sequence of similarity measure values depending on a previously determined sequence of similarity measure values, the previously determined sequence of similarity measure values being determined at least in part from a previously-received packet from the packet transmitter; and
perform frequency offset estimation on the filtered sequence of similarity measure values.

11. The packet receiver according to claim 10, wherein the processing circuitry is further configured to cause the packet receiver to:
- receive an indication of relative movement between the packet receiver and the packet transmitter; and
- in response to the indication, reset the low-pass filter to a default state, wherein in the default state the sequence of similarity measure value does not depend on any previously determined sequence of similarity measure values.

12. The packet receiver according to claim 10, wherein the packet receiver has access to a set of low-pass filters and wherein which low-pass filter to use depends on from which packet transmitter the packet is received.

13. The packet receiver according to claim 10, wherein the frequency offset estimation yields a frequency offset estimate value, wherein the frequency offset estimate value corresponds to a phase rotation value, wherein the processing circuitry is further configured to cause the packet receiver to frequency compensate the OFDM symbol by applying the opposite phase rotation value to the OFDM symbol.

14. The packet receiver according to claim 10, wherein the sequence of similarity measure values is determined by correlating the CP of the preamble with the end-portion of the preamble.

15. The packet receiver according to claim 10, wherein the packet comprises a plurality of data symbols, each data symbol having its own CP defined by a repetition of samples from an end-portion of the data symbol, wherein the processing circuitry is configured to cause the packet receiver to determine the sequence of similarity measure values, apply the low-pass filter, and perform the frequency offset estimation for at least one of the data symbols.

16. The packet receiver according to claim 10, wherein the packet receiver is part of a gateway, circuit breaker, circuit protector, transformer, or switchgear.

17. The packet receiver according to claim 10, wherein the processing circuitry is further configured to cause the packet receiver to reset the low-pass filter to a default state, wherein in the default state the sequence of similarity measure value does not depend on any previously determined sequence of similarity measure values.

18. A non-transitory storage medium storing a computer program for frequency offset estimation in a wireless communication network that employs time based scheduling of packets, the computer program comprising computer code which, when run on processing circuitry of a packet receiver, causes the packet receiver to:
- receive a packet from a packet transmitter, wherein the packet comprises a preamble that is composed of samples of a single orthogonal frequency-division multiplexing (OFDM) symbol, the preamble having a cyclic prefix (CP) defined by a repetition of samples from an end-portion of the preamble, wherein the preamble, except for the CP, is free from any repeated sequence of samples;
- determine a sequence of similarity measure values between the CP of the preamble and the end-portion of the preamble, the sequence of similarity measure values depending on a previously determined sequence of similarity measure values;
- apply a low-pass filter to the sequence of similarity measure values, resulting in a filtered sequence of similarity measure values, the filtered sequence of similarity measure values depending on a previously determined sequence of similarity measure values, the previously determined sequence of similarity measure values being determined at least in part from a previously-received packet from the packet transmitter; and
- perform frequency offset estimation on the filtered sequence of similarity measure values.

19. The non-transitory storage medium of claim 18, the computer program when run further causes the packet receiver to reset the low-pass filter to a default state, wherein in the default state the sequence of similarity measure value does not depend on any previously determined sequence of similarity measure values.

* * * * *